(12) United States Patent  
Shachar et al.

(10) Patent No.: US 11,868,207 B2
(45) Date of Patent: Jan. 9, 2024

(54) SYSTEM, METHOD, AND COMPUTER PROGRAM FOR INTELLIGENT SELF-HEALING OPTIMIZATION FOR FALLOUT REDUCTION

(71) Applicant: Amdocs Development Limited, Limassol (CY)

(72) Inventors: Anat Shachar, Tel Aviv (IL); Vivi Miranda, Raanana (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 3 days.

(21) Appl. No.: 17/688,741

(22) Filed: Mar. 7, 2022

(65) Prior Publication Data
US 2023/0281073 A1    Sep. 7, 2023

(51) Int. Cl.
    *G06F 11/07*    (2006.01)
(52) U.S. Cl.
    CPC ...... *G06F 11/0793* (2013.01); *G06F 11/0709* (2013.01); *G06F 11/0775* (2013.01); *G06F 11/0781* (2013.01)
(58) Field of Classification Search
    CPC ............. G06F 11/0709; G06F 11/0775; G06F 11/0781; G06F 11/079; G06F 11/0793
    See application file for complete search history.

(56) References Cited

U.S. PATENT DOCUMENTS

| 7,194,445 B2 * | 3/2007 | Chan .................. G06F 11/2257 714/E11.026 |
| 9,069,737 B1 | 6/2015 | Kimotho et al. |
| 9,876,673 B2 * | 1/2018 | Margalit ............. H04L 41/0672 |
| 10,621,578 B2 * | 4/2020 | Kurian ................. G06Q 20/382 |
| 2004/0059966 A1 | 3/2004 | Chan et al. |
| 2021/0295285 A1 * | 9/2021 | Rajendran .......... G06Q 20/4016 |
| 2021/0397497 A1 | 12/2021 | Tiwari et al. |

FOREIGN PATENT DOCUMENTS

EP    3879404 A1    9/2021

OTHER PUBLICATIONS

Partial International Search Report and Written Opinion from PCT Application No. PCT/IB2023/052122, dated Jun. 26, 2023, 11 pages.

\* cited by examiner

*Primary Examiner* — Joseph R Kudirka
(74) *Attorney, Agent, or Firm* — Zilka-Kotab, P.C.

(57) ABSTRACT

As described herein, a system, method, and computer program are provided for intelligent self-healing optimization for fallout reduction. A set of self-healing rules are stored that are configured to provide resolutions to failures detected in a computer process. Data associated with use of the self-healing rules is collected. The data is processed using a machine learning model to generate one or more recommendations for optimizing the set of self-healing rules. The one or more recommendations are output.

20 Claims, 5 Drawing Sheets

SYSTEM, METHOD, AND COMPUTER PROGRAM FOR INTELLIGENT SELF-HEALING OPTIMIZATION FOR FALLOUT REDUCTION

FIELD OF THE INVENTION

The present invention relates to techniques for resolving failures in computer system processes.

BACKGROUND

Typically, any failure in a computer system process delays completion of whatever task was being performed. For example, with regard to order fulfillment, which sits at the critical path for providing customers their service, any failure encountered during the order fulfillment process will delay the service completion and will therefore negatively impact order completion time, and in turn will negatively impact customer satisfaction as well as have a negative financial impact. It is therefore beneficial to have techniques for resolving failures in computer system processes, including providing automatic resolutions to enable the system to be self-healing.

To date, failures are usually addressed by applying manually configured rules to the failure. However, existing solutions do not perform any analysis of how the self-healing rules perform, let alone provide any way to optimize the set of self-healing rules relied upon.

There is thus a need for addressing these and/or other issues associated with the prior art.

SUMMARY

As described herein, a system, method, and computer program are provided for intelligent self-healing optimization for fallout reduction. A set of self-healing rules are stored that are configured to provide resolutions to failures detected in a computer process. Data associated with use of the self-healing rules is collected. The data is processed using a machine learning model to generate one or more recommendations for optimizing the set of self-healing rules. The one or more recommendations are output.

DETAILED DESCRIPTION

Figure 1:
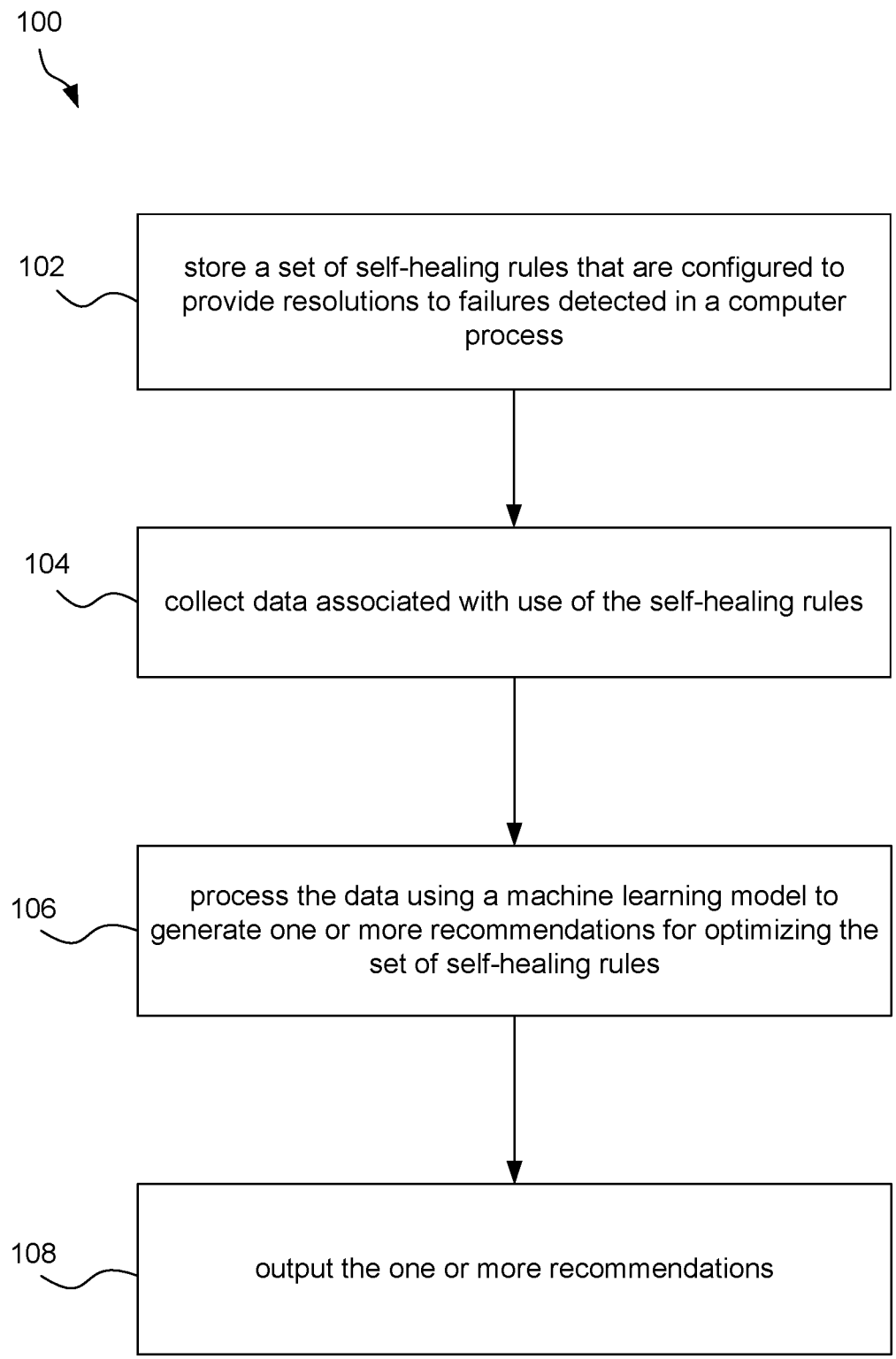
FIG. 1 illustrates a method for intelligent self-healing optimization for fallout reduction, in accordance with one embodiment.

FIG. 1 illustrates a method 100 for intelligent self-healing optimization for fallout reduction, in accordance with one embodiment. The method 100 may be performed by any computer system(s) described below with respect to FIGS. 4 and/or 5. In one example described herein, the method 100 may be performed by a computer system of a content or service provider that is used for executing an ordering process.

In operation 102, a set of self-healing rules are stored that are configured to provide resolutions to failures detected in a computer process. The computer process may be any process performed in a computer system by executing computer code. In an embodiment, the computer process may be an application, a process within an application, a flow, etc.

In one exemplary implementation described herein, the computer process may be an order handling process. The order handling process may include flows for receiving an order, processing the order, fulfilling the order, etc. The orders may relate to communication services or content services provided by a communication service provider (CSP), just by way of example.

As noted above, a set of self-healing rules are stored (e.g. in memory, a data structure, etc.) for the computer process, and are configured to provide resolutions to failures detected in the computer process. The failures may refer to any errors occurring within the computer process, and accordingly during execution of the computer process. For example, the failures may be detected when the computer process outputs error codes. The failures, if not resolved, may result in fallouts. In the context of the order handling process, a fallout may refer to as inability to complete/satisfy a received order.

The set of self-healing rules include a plurality of rules predefined for use in providing automatic resolutions to failures detected in the computer process. In an embodiment, one or more of the rules may be manually defined. In an embodiment, the rules may each indicate at least one action to perform and at least one error code (or other indication of failure) to be detected as a condition for performing the at least one action. In the context of this embodiment, the action(s) may be performed to revolve an associated failure identified by the error code(s).

In operation 104, data associated with use of the self-healing rules is collected. With respect to the present description, "use" of the self-healing rules refers to application of the self-healing rules in connection with execution of the computer process. In order words, "use" of the self-healing rules includes evaluating the self-healing rules with respect to any failures detected in association with the computer process, for the purpose of performing actions to resolve those failures.

It should be noted that the data may include any information that is in any way to related to use of the self-healing rules. Depending on a type of the data, the data may be collected in real-time during execution of the computer process and/or may be collected after the computer process has terminated (e.g. in a failure).

In an embodiment, the data may include information being processed by the computer process. In an embodiment, the data may include one or more design files detailing steps and integration executed in each flow of the computer process. In an embodiment, the data may include real-time flow information used by a flow instantiation. In an embodiment, the data may include self-healing execution logs for each executed flow of the computer process. In an embodiment, the data may include fallout ticket data for each error that resulted in a fallout.

In operation 106, the data is processed using a machine learning model to generate one or more recommendations for optimizing the set of self-healing rules. The machine learning model may be any model that has been trained, using machine learning, to be able to generate self-healing rule optimizations. In embodiments, the machine learning model may be a classification model and/or a regression model.

In one embodiment, the machine learning model may be trained using training data. In this embodiment, the training data may be collected for use in training the machine learning model. For example, the training data may be collected from prior use of self-healing rules during prior executions of the computer process. As another example, the training data may be collected from manual input provided by users in association with outcomes of the prior use of self-healing rules.

In an embodiment, the machine learning model may analyze a subset of failures detected in the computer process and unresolved by the set of self-healing rules. For example, the subset of failures may include at least one failure for which an applied self-healing rule did not result in a resolution. As another example, the subset of failures may include at least one failure for which no self-healing rule exists.

The one or more recommendations for optimizing the set of self-healing rules may each include any suggestion for changing the set of self-healing rules in a manner that improves the ability of the set of self-healing rules to automatically resolve failures detected in the computer process. In an embodiment, the one or more recommendations may include a recommendation to remove a redundant rule in the set of self-healing rules. In an embodiment, the one or more recommendations may include a recommendation to define a new rule for the set of self-healing rules that will address a particular failure.

In an embodiment, the one or more recommendations may include a recommendation for at least one modification to make to at least one (existing) rule in the set of self-healing rules that will increase a success rate of the set of self-healing rules. The at least one modification may include a modification to a condition of a rule, as an option. As another option, the at least one modification may include a modification to an action indicated by the rule as to be performed.

In operation 108, the one or more recommendations are output. In an embodiment, the one or more recommendations may be output for presentation (display) to a user. In this embodiment, the user may review the one or more recommendations. As another option, the user may approve and cause the set of self-healing rules to be optimized in accordance with the one or more recommendations (i.e. by implementing the recommended changes to the set of self-healing rules).

In another embodiment, the one or more recommendations may be output for automatically causing the set of self-healing rules to be optimized in accordance with the one or more recommendations. For example, the one or more recommendations may be output to an optimization system that automatically optimizes the set of self-healing rules in accordance with the one or more recommendations (i.e. by automatically implementing the recommended changes to the set of self-healing rules).

To this end, the method 100 may be performed to provide an analysis of how existing self-healing rules perform for the computer process, and to provide recommendations for how the existing self-healing rules can be optimized to improve their ability to resolve failures in the computer process. Improving the self-healing rules in this manner may reduce fallouts occurring in association with the computer process, and thereby reduce manual and automatic processes otherwise required to address fallouts.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
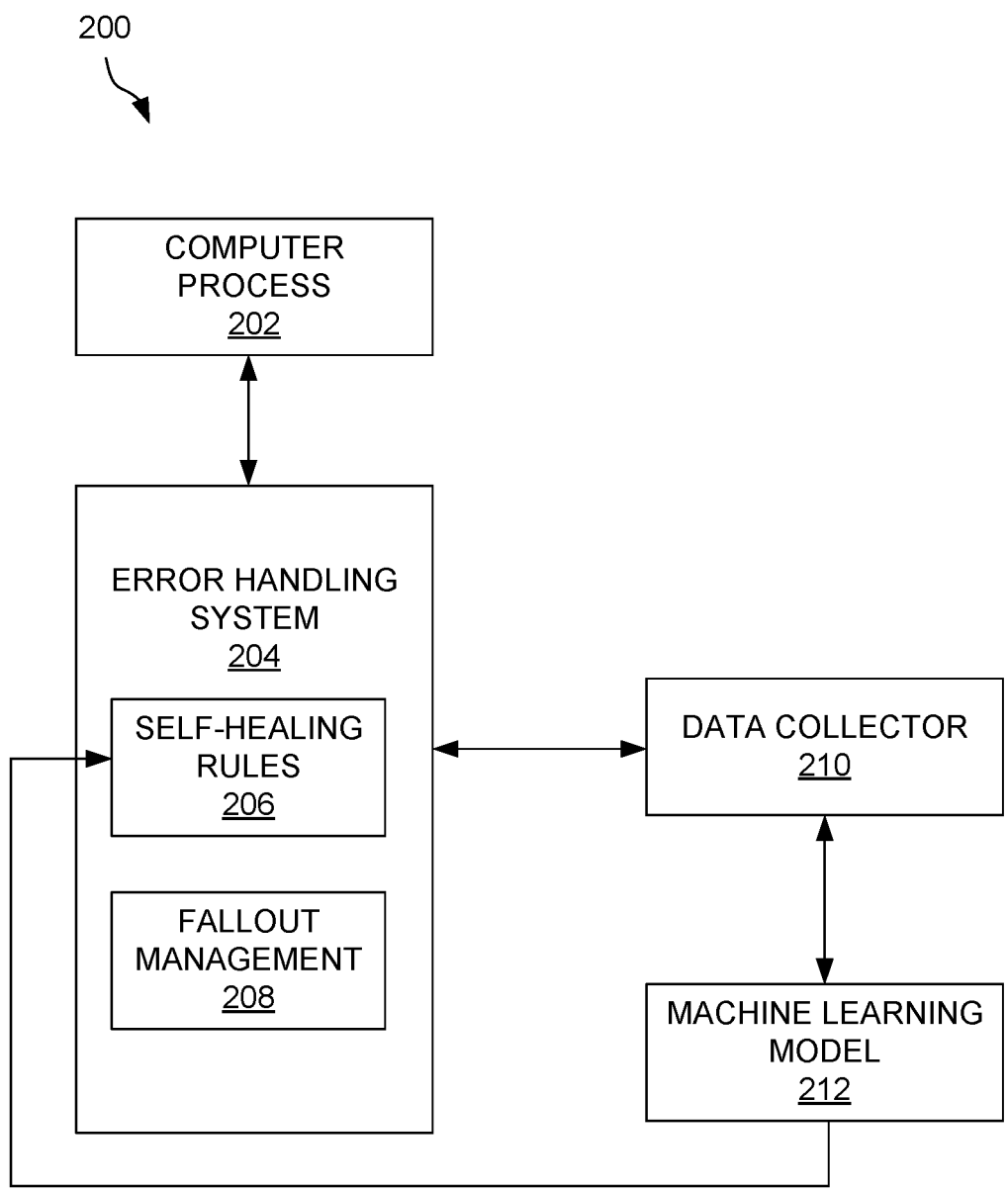
FIG. 2 illustrates a flow diagram of a system that provides intelligent self-healing optimization for fallout reduction, in accordance with one embodiment.

FIG. 2 illustrates a flow diagram of a system 200 that provides intelligent self-healing optimization for fallout reduction, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

As shown, during execution of a computer process 202, an error handling system 204 uses self-healing rules 206 to resolve failures occurring in the computer process 202. The error handling system 204 also includes a fallout management process 206 that is configured to manage any fallouts resulting from the failures occurring in the computer process 202 (i.e. when the self-healing rules 206 are unable to resolve the failures).

A data collector 210 is configured to collect data associated with use of the self-healing rules 206 by the error handling system 204 during the execution of the computer process 202. The data collector 210 may collect any data related to the computer process 202, the detected failures, the actions performed to provide resolutions to the failures, etc.

The data collector 210 then provides the collected data as input to a machine learning model 212. The machine learning model 212 processes the data to generate one or more recommendations for optimizing the self-healing rules 206. As shown, output of the machine learning model 212 (i.e. the recommendations) may be applied to the self-healing rules 206 to provide the optimization. The optimized self-healing rules 206 may then be used during subsequent executions of the computer process 202. This flow may be repeated for every execution of the computer process 202, as an option.

In the exemplary implementation, the computer process 202 may be an order handling process. The self-healing rules 206 may be rules configured to resolve any errors occurring during the order handling process. The resolutions may be provided such that fallouts associated with orders received via the order handling process may be avoided.

During execution of the order handling process, a failure may be detected. The self-healing rules 206 may be applied to the failure in an attempt to resolve the failure. The self-healing rules 206 may or may not be successful in providing a resolution, depending on whether the self-healing rules 206 are correctly configured to resolve the failure, whether conflicting (duplicate) self-healing rules 206 exist such that no single resolution can be determined and applied, or whether any self-healing rule 206 even exists to address the particular failure.

The data collector 210 operates to collect data associated with the application of the self-healing rules 206 during the execution of the order handling process. Table 1 illustrates various examples of data that may be collected in association with the execution of the order handling process.

TABLE 1

1. Order information, such as selected offer, the day and time it was captured, channel etc.
2. The (bpmn) design files detailing the steps and integration executed in each fulfillment flow.
3. The flow context, real-time flow information used by the flow instantiation from the submitted order items.
4. Self-healing execution logs for each flow, detailing:
   The error ID (identifier), origin, date/time.
   Step occurred.
   Indication if a rule was configured for the error. If yes, rule ID, rule definition, and actions taken.
   The outcome of the executed rule
5. Fallout ticket data for each error that resulted in fallout, detailing:
Ticket ID and relation to the originating order and flow.
The actions taken by the operations agent.
Indication if the operation was triggered by automatic operation, such application programming interface (API), job, etc.
The resolution codes.

The data collector 210 provides the ordering handling process data to the machine learning model 212. The machine learning model 212 will analyze the data, focusing on errors where a rule attempted and failed to resolve the issue, and errors where a rule did not exist. The machine learning model 212 will ingest volumes of data and will continuously learn based on data provided by the data collector 210.

The machine learning model 212 output will consist of recommendations detailing the following:

1) For existing rules, which rules need modification in their condition or action. Detail what is the target condition and action that is recommended to increase a resolution success rate.

2) For existing rules, a recommendation to remove redundant rules.

3) New rules to be defined. As part of the analysis, the machine learning model 212 will pick up on repeat error profiles that can be answered by configuration of new self-healing rules.

The recommendations may then be used to optimize the self-healing rules 206 used during subsequent executions of the order handling process.

Figure 3:
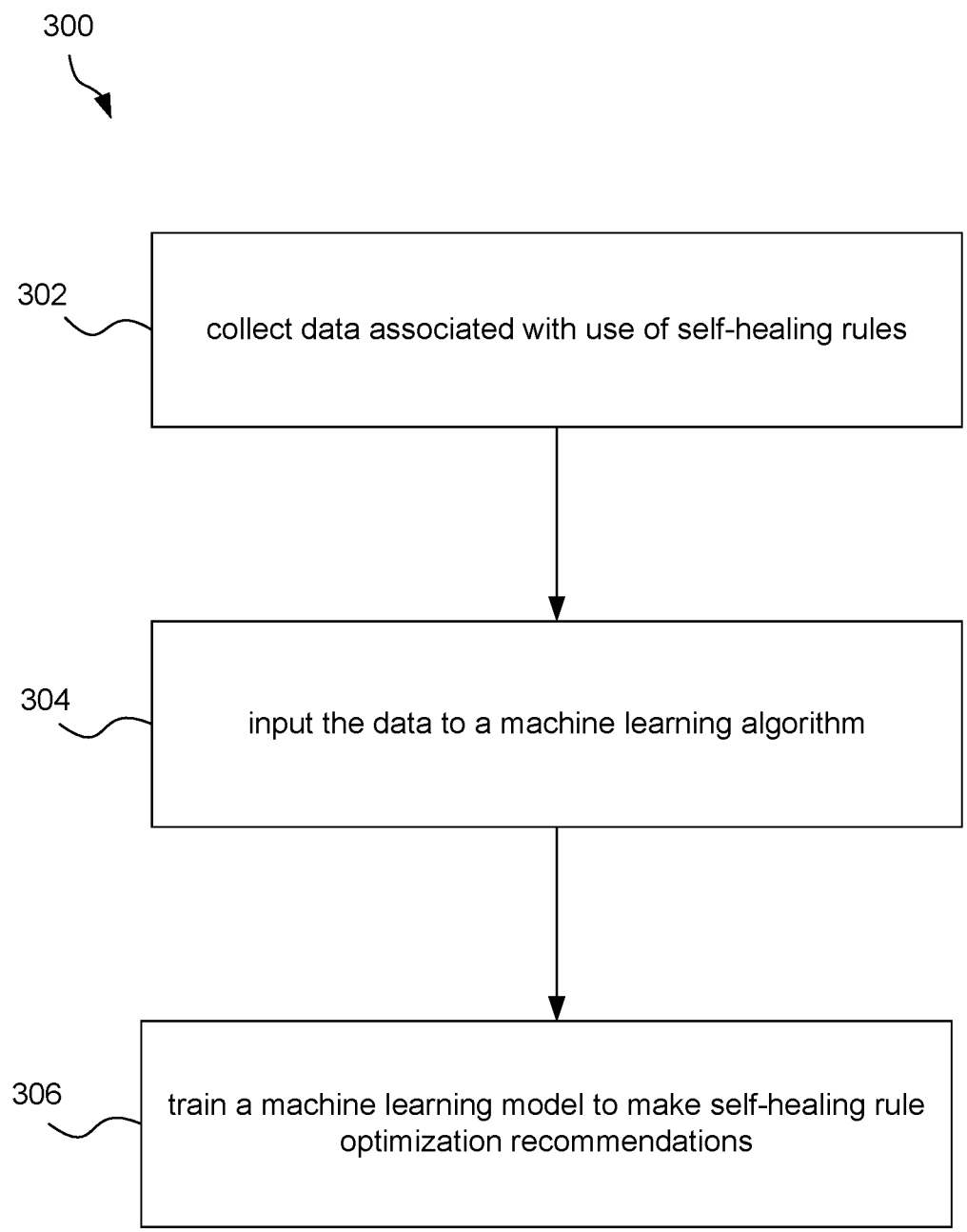
FIG. 3 illustrates a method for training a machine learning model to make one or more recommendations for optimizing a set of self-healing rules, in accordance with one embodiment.

FIG. 3 illustrates a method 300 for training a machine learning model to make one or more recommendations for optimizing a set of self-healing rules, in accordance with one embodiment. As an option, the method 300 may be carried out in the context of the details of the previous figure and/or any subsequent figure(s). Of course, however, the method 300 may be carried out in the context of any desired environment. Further, the aforementioned definitions may equally apply to the description below.

In operation 302, data associated with use of self-healing rules for a computer process is collected. The data may be collected from a data collector that monitors execution of the computer process and/or that monitors an error handling system that uses self-healing rules to resolve failures occurring in the computer process, such as data collector 210 described above with reference to FIG. 2. The data may include any of the data mentioned in Table 1 above.

In operation 304, the data is input to a machine learning algorithm. The machine learning algorithm is configured to use the data to train a machine learning model. The machine learning algorithm may be configured to train a classification model and/or a regression model.

In operation 306, a machine learning model is trained to make self-healing rule optimization recommendations. As noted above, the machine learning model may be a classification model and/or a regression model. The machine learning model may then be used to make recommendations for optimizing the self-healing rules for the computer process.

As an option, the method 300 may be periodically repeated. Thus, as new data becomes available to train the machine learning model, such new data may be collected (operation 302) and input to the machine learning algorithm (operation 304) for training the machine learning model based upon the new data (operation 306).

Figure 4:
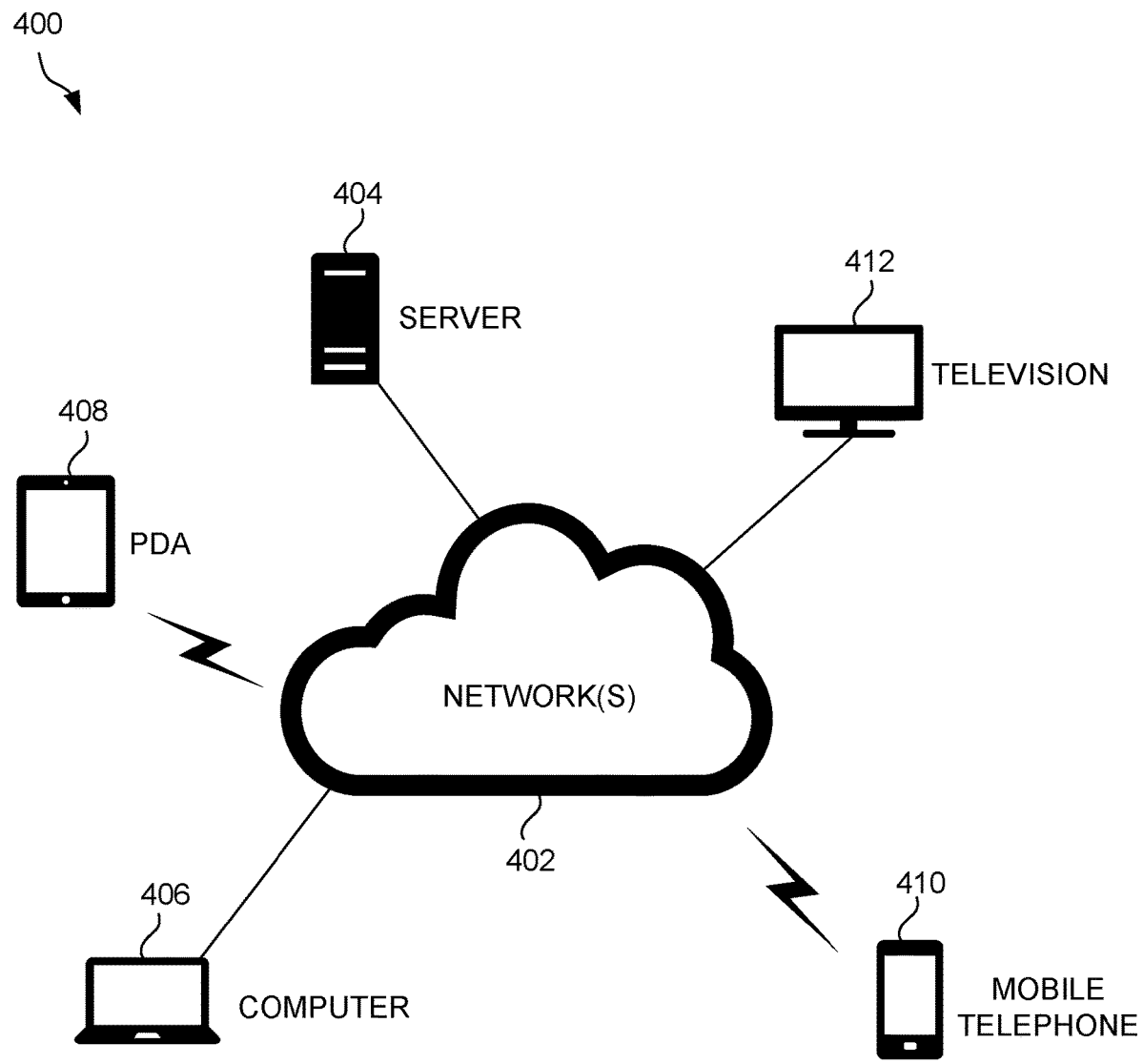
FIG. 4 illustrates a network architecture, in accordance with one possible embodiment.

FIG. 4 illustrates a network architecture 400, in accordance with one possible embodiment. As shown, at least one network 402 is provided. In the context of the present network architecture 400, the network 402 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 402 may be provided.

Coupled to the network 402 is a plurality of devices. For example, a server computer 404 and an end user computer 406 may be coupled to the network 402 for communication purposes. Such end user computer 406 may include a desktop computer, lap-top computer, and/or any other type of logic. Still yet, various other devices may be coupled to the network 402 including a personal digital assistant (PDA) device 408, a mobile phone device 410, a television 412, etc.

Figure 5:
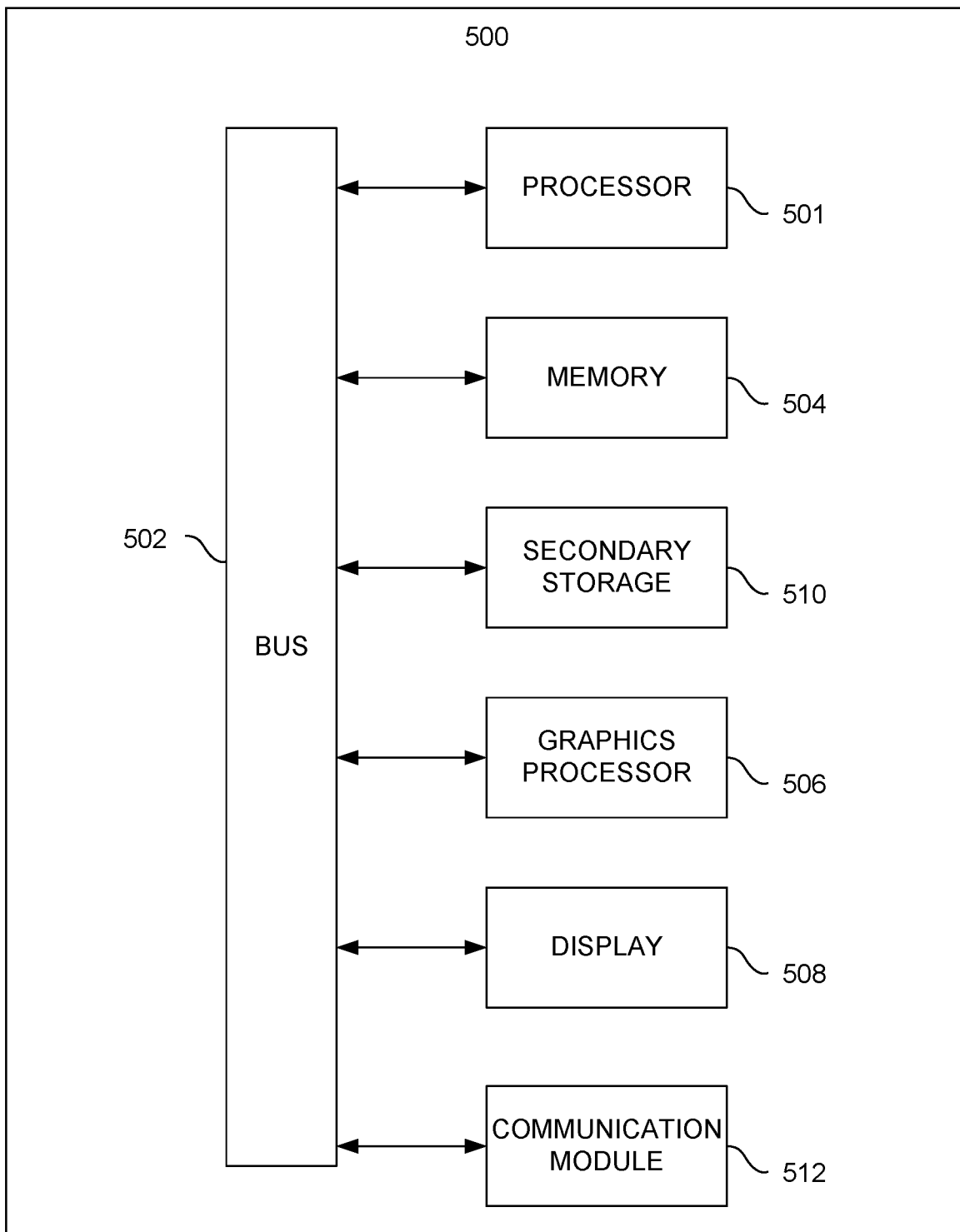
FIG. 5 illustrates an exemplary system, in accordance with one embodiment.

FIG. 5 illustrates an exemplary system 500, in accordance with one embodiment. As an option, the system 500 may be implemented in the context of any of the devices of the network architecture 400 of FIG. 4. Of course, the system 500 may be implemented in any desired environment.

As shown, a system 500 is provided including at least one central processor 501 which is connected to a communication bus 502. The system 500 also includes main memory 504 [e.g. random access memory (RAM), etc.]. The system 500 also includes a graphics processor 506 and a display 508.

The system 500 may also include a secondary storage 510. The secondary storage 510 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 504, the secondary storage 510, and/or any other memory, for that matter. Such computer programs, when executed, enable the system 500 to perform various functions (as set forth above, for example). Memory 504, storage 510 and/or any other storage are possible examples of non-transitory computer-readable media.

The system 500 may also include one or more communication modules 512. The communication module 512 may be operable to facilitate communication between the system 500 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer-readable media storing computer instructions which when executed by one or more processors of a device cause the device to:
   store a set of self-healing rules that are configured to provide resolutions to failures detected in a computer process, wherein the one or more self-healing rules each indicate:
      at least one action to perform, and
      at least one error code to be detected from an output of the computer process as a condition for performing the at least one action;
   collect data associated with use of the self-healing rules;
   process the data using a machine learning model to generate one or more recommendations for optimizing the set of self-healing rules, wherein the one or more recommendations include at least a first recommendation to at least one of:
    modify the condition of one of the self-healing rules, or modify the at least one action indicated by the one of the self-healing rules as to be performed; and
    automatically cause the set of self-healing rules to be optimized in accordance with the one or more recommendations.

2. The non-transitory computer-readable media of claim 1, wherein the set of self-healing rules include one or more rules that are manually defined.

3. The non-transitory computer-readable media of claim 1, wherein the data includes:
    information being processed by the computer process.

4. The non-transitory computer-readable media of claim 1, wherein the data includes:
    one or more design files detailing steps and integration executed in each flow of the computer process.

5. The non-transitory computer-readable media of claim 1, wherein the data includes:
    real-time flow information used by a flow instantiation.

6. The non-transitory computer-readable media of claim 1, wherein the data includes:
    self-healing execution logs for each executed flow of the computer process.

7. The non-transitory computer-readable media of claim 1, wherein the data includes:
    fallout ticket data for each error that resulted in a fallout.

8. The non-transitory computer-readable media of claim 1, wherein the data is collected during execution of the computer process.

9. The non-transitory computer-readable media of claim 1, wherein the device is further caused to:
    train the machine learning model, using machine learning, to generate self-healing rule optimizations,
    wherein the machine learning model is one of a classification model or a regression model, and
    wherein the machine learning model periodically learns based on periodic data collected over continual use of the self-healing rules.

10. The non-transitory computer-readable media of claim 1, wherein the machine learning model analyzes a subset of failures detected in the computer process and unresolved by the set of self-healing rules.

11. The non-transitory computer-readable media of claim 10, wherein the subset of failures include at least one failure for which an applied self-healing rule did not result in a resolution.

12. The non-transitory computer-readable media of claim 10, wherein the subset of failures include at least one failure for which no self-healing rule exists.

13. The non-transitory computer-readable media of claim 1, wherein the automatically causing the set of self-healing rules to be optimized will increase a success rate of the set of self-healing rules.

14. The non-transitory computer-readable media of claim 1, wherein the one or more recommendations for optimizing the set of self-healing rules includes:
    a second recommendation to remove a redundant rule in the set of self-healing rules,
    wherein existence of the redundant rule causes no single resolution to be able to be determined and applied.

15. The non-transitory computer-readable media of claim 1, wherein the one or more recommendations for optimizing the set of self-healing rules includes:
    a second recommendation to define a new rule for the set of self-healing rules that will address a particular failure.

16. The non-transitory computer-readable media of claim 1, wherein the one or more recommendations are output to an optimization system that automatically optimizes the set of self-healing rules in accordance with the one or more recommendations by automatically implementing changes to the set of self-healing rules that are indicated by the one or more recommendations.

17. The non-transitory computer-readable media of claim 1, wherein the computer process is an order handling process that includes flows for receiving an order, processing the order, and fulfilling the order, wherein the set of self-healing rules are configured to provide resolutions to failures detected in the order handling process that will otherwise result in fallout including an inability to complete order handling processing for a received order, and wherein the set of self-healing rules are optimized to reduce fallouts occurring in association with the order handling process.

18. The non-transitory computer-readable media of claim 1, wherein the device is further caused to:
    provide automated resolutions to additional failures detected in the computer process, using the optimized set of self-healing rules.

19. A method, comprising:
at a computer system:
    storing a set of self-healing rules that are configured to provide resolutions to failures detected in a computer process, wherein the one or more self-healing rules each indicate:
        at least one action to perform, and
        at least one error code to be detected from an output of the computer process as a condition for performing the at least one action;
    collecting data associated with use of the self-healing rules;
    processing the data using a machine learning model to generate one or more recommendations for optimizing the set of self-healing rules, wherein the one or more recommendations include at least a first recommendation to at least one of:
        modify the condition of one of the self-healing rules, or
        modify the at least one action indicated by the one of the self-healing rules as to be performed; and
    automatically causing the set of self-healing rules to be optimized in accordance with the one or more recommendations.

20. A system, comprising:
    a non-transitory memory storing instructions; and
    one or more processors in communication with the non-transitory memory that execute the instructions to:
        store a set of self-healing rules that are configured to provide resolutions to failures detected in a computer process, wherein the one or more self-healing rules each indicate:
            at least one action to perform, and
            at least one error code to be detected from an output of the computer process as a condition for performing the at least one action;
        collect data associated with use of the self-healing rules;
        process the data using a machine learning model to generate one or more recommendations for optimizing the set of self-healing rules, wherein the one or more recommendations include at least a first recommendation to at least one of:
            modify the condition of one of the self-healing rules, or modify the at least one action indicated by the one of the self-healing rules as to be performed; and automatically cause the set of self-healing rules to be optimized in accordance with the one or more recommendations.

\* \* \* \* \*